United States Patent
Lee et al.

[11] Patent Number: 6,126,770
[45] Date of Patent: Oct. 3, 2000

[54] METHOD FOR FABRICATING A SPINDLE OR ROLLER EMPLOYING A COMPOSITE MATERIAL

[75] Inventors: Dai-Gil Lee; Hyun-Surk Kim; Young-Goo Kim, all of Taejon; Jin-Kyung Choi, Kyunggi-Do; Seong-Sik Cheon; Durk-Hyun Cho, both of Seoul, all of Rep. of Korea

[73] Assignee: Korea Advanced Institute of Science & Technology, Taejon, Rep. of Korea

[21] Appl. No.: 08/986,456

[22] Filed: Dec. 5, 1997

[30] Foreign Application Priority Data

Dec. 5, 1996 [KR] Rep. of Korea ................. 96-61957

[51] Int. Cl.[7] .................................................. B65H 81/00
[52] U.S. Cl. .................... 156/172; 156/160; 464/181; 464/183; 464/903
[58] Field of Search .................................. 156/172, 173, 156/175, 293, 294, 160, 161; 464/903, 181, 183

[56] References Cited

U.S. PATENT DOCUMENTS

| | | |
|---|---|---|
| 4,171,626 | 10/1979 | Yates et al. . |
| 4,248,062 | 2/1981 | McLain et al. ................. 156/173 X |
| 4,362,521 | 12/1982 | Puck et al. ......................... 464/181 |
| 4,853,060 | 8/1989 | Nickel ............................... 156/172 |
| 4,952,195 | 8/1990 | Traylor ............................. 464/181 |
| 5,127,975 | 7/1992 | Zackrisson et al. . |
| 5,222,915 | 6/1993 | Petrzelka et al. . |
| 5,261,991 | 11/1993 | Zackrisson et al. . |

OTHER PUBLICATIONS

Cho, Durk H., et al "Manufacture of one–piece automotive drive shafts with aluminum and composite materials" Composite Structures, vol. 38, No. 1–4, May–Aug. 1997, pp. 309–319.

Low–Weight, Impact–Resistant Helicopter Drive Shafts, Composite Materials: Testing and Design (Third Conference), I.E. Figge, et al. 650–662 (1975).

Primary Examiner—Jeff H. Aftergut
Attorney, Agent, or Firm—Knobbe, Martens, Olson & Bear LLP

[57] ABSTRACT

The present invention provides a method for fabricating spindle and roller empying rotation axes made of a composite material, which comprises a step of inserting a front metal part and an end metal part into a front and an end of a rotation axis made of a composite material. In accordance with the present invention, spindle and roller with easy control of balancing and less inertia on rotation, can be fabricated, by employing rotation axes made of a composite material which has a high stiffness, superior torque transfer capability and natural frequency.

7 Claims, 5 Drawing Sheets

METHOD FOR FABRICATING A SPINDLE OR ROLLER EMPLOYING A COMPOSITE MATERIAL

FIELD OF THE INVENTION

The present invention relates to a method for fabricating spindle and roller employing a composite axis, more specifically, to a method for fabricating an air spindle, an air roller and a ball bearing roller by employing a rotation axis made of a composite material.

BACKGROUND OF THE INVENTION

A steel material has been widely applied for the fabrication of rotation axes of air spindle, air roller and ball bearing roller which are employed in precision grinding instruments. However, the steel is, though it is of a high strength, so heavy that balancing cannot be easily accomplished during rotation due to its extremely high inertia. So, aluminum which is much lighter than the steel, has been substituted for the steel. The aluminum, however, has not been practically applied in the art, since its strength is too weak to use in the same area.

To solve the said problems, composite materials such as carbon fiber epoxy composite material and glass fiber epoxy composite material have been developed as substitutes for the metal materials. Since the composite material has a higher specific strength than steel or aluminum, it is lighter than the metal materials with the same strength. Moreover, it has an advantage of minimizing sliding on contact with other mechanical elements because it enables fast start and stop due to its low rotation inertia. Furthermore, its characteristic of controlling vibration is superior to that of steel or aluminum, since it has much higher value of damping factor(about 1%), comparing with that of steel(0.001—0.1%).

However, in the event of fabricating mechanical elements using only the composite material, much material is needed to satisfy both torque-transfer capability and natural frequency. Therefore, instead of using the composite material, it is preferably suggested to employ both a composite material and a metal material such as steel or high strength aluminum which is light and has a superior torque-transfer capability. In this regard, several methods for fabricating mechanical elements have been proposed in the art: a mechanical joining method using bolt or rivet; a joining method using an adhesive cement; and, a concurrent hardening method using a resin remaining in the course of hardening of a composite material on a metal material. However, the mechanical joining method, since it may cause a damage to the composite material, has been hardly employed to the fabrication of main elemes such as axes of spindle or roller. Naturally, the joining method or the concurrent hardening method has been widely used in the art.

In addition, some methods for fabricating mechanical elements using the said composite material have been disclosed so far(see: J. H. Choi and D. G. Lee, J. Adhesion, 44:197 212(1994); W. T. Kim and D. G. Lee, Composite Structures, 30:229–240(1995); S. J. Lee and D. G. Lee, J. Adhesion, 50:165–180 (1995)).

However, air spindle, air roller and ball bearing roller are still fabricated by employing rotation axes made of steel or aluminum materials, in accordance with the conventional methods which have shortcomings discussed as above. Accordingly, there are strong reasons for exploring and developing an improved method for fabricating air spindle, air roller and ball bearing roller.

SUMMARY OF THE INVENTION

In this regard, the present inventors have made an effort to fabricate spindle and roller with easy control of balancing due to its lightness and less inertia on rotation, and successfully developed a method for fabricating an air spindle, an air roller and a ball bearing roller, by employing rotation axes made of a composite material which has a high stiffness, superior torque transfer capability and natural frequency.

A primary object of the present invention is, therefore, to provide a method for fabricating spindle and roller which employ rotation axes made of a composite material.

BRIEF DESCRIPTION OF DRAWINGS

The above and the other objects and features of the present invention will become apparent from the following description given in conjunction with the accompanying drawings, in which.

DETAILED DESCRIPTION OF THE INVENTION

The present invention is explained in detail with references on the accompanying drawings, which should not be taken to limit the scope of the present invention.

Figure 1:
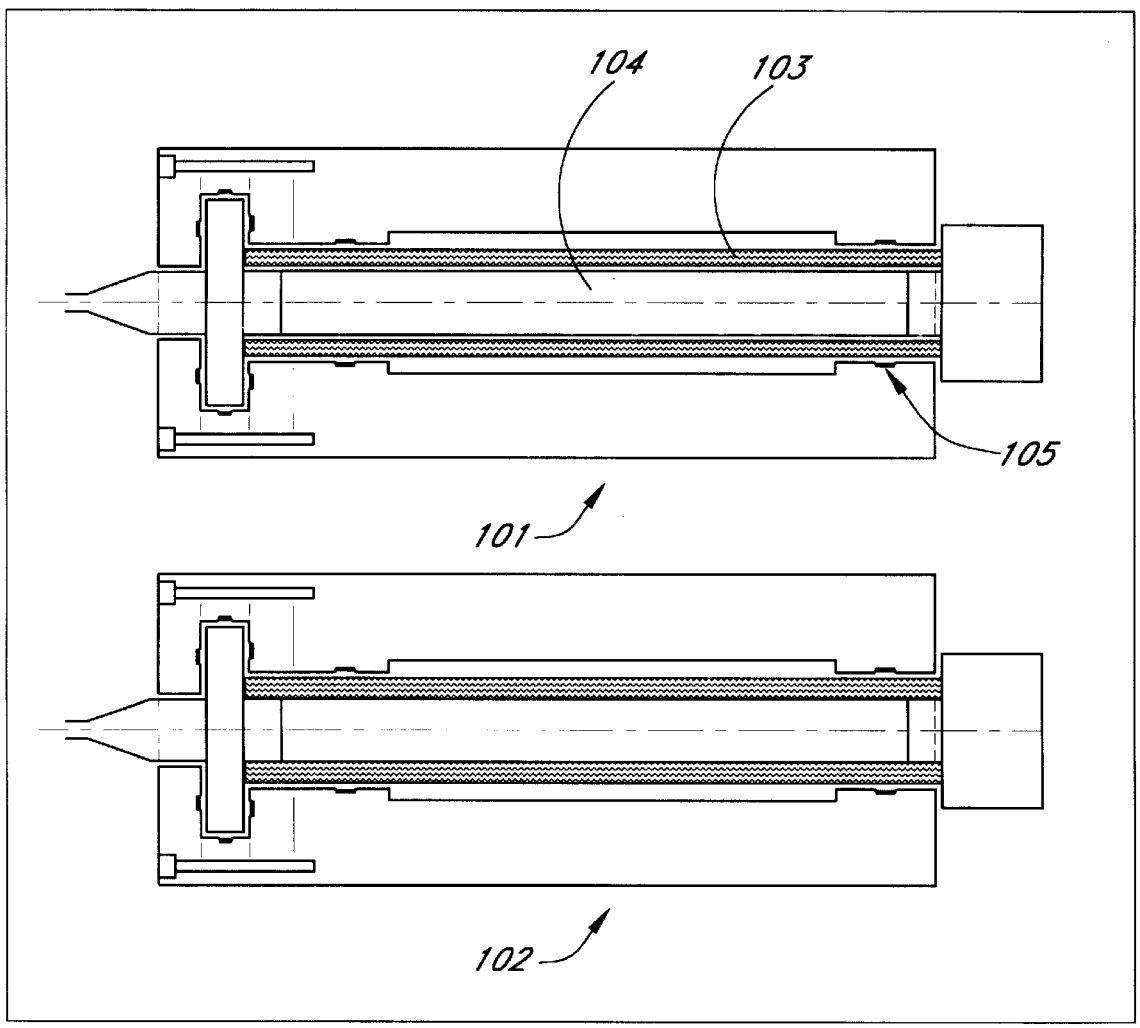
FIG. 1 is a longitudinal-sectional view of two types of air spindle of the present invention.
Figure 2:
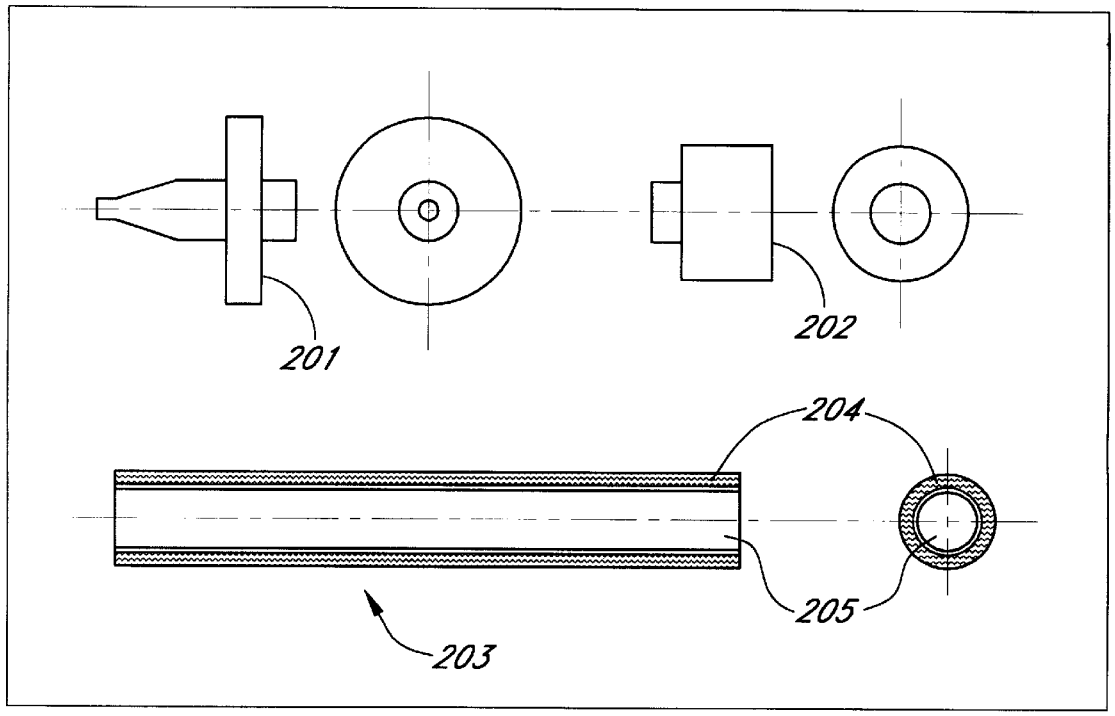
FIG. 2 illustrates parts of a rotation axis of one type of air spindle of the invention.
Figure 3:
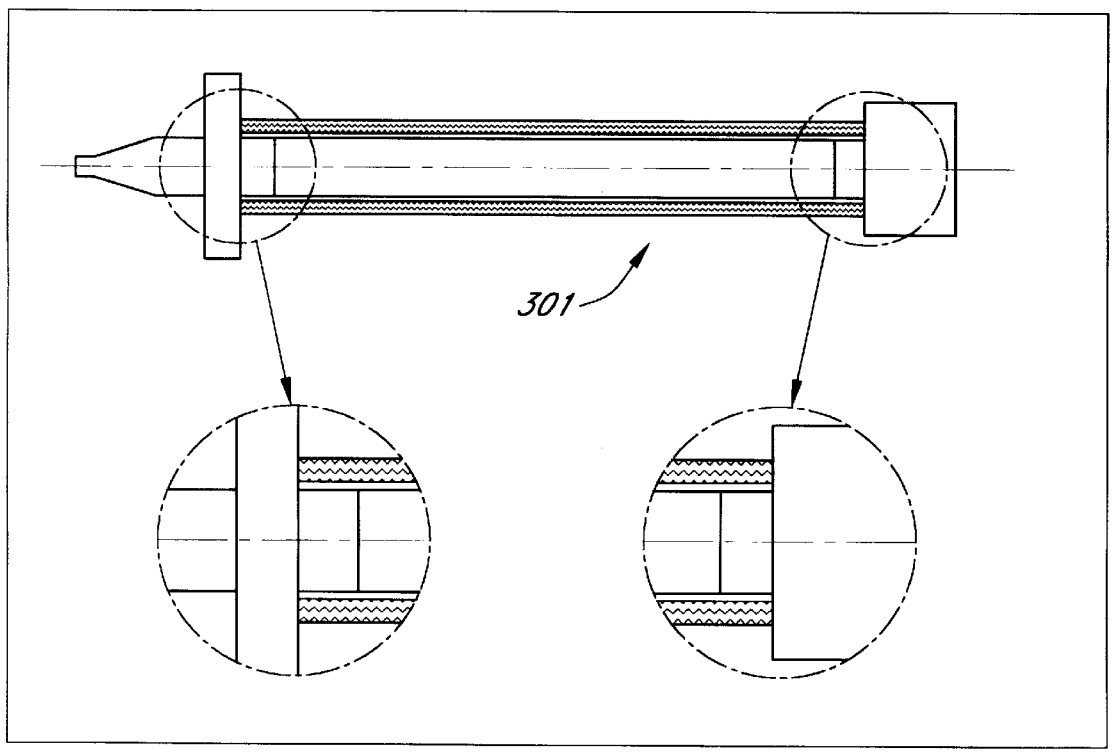
FIG. 3 depicts an assembly of the parts in FIG. 2.
Figure 4:
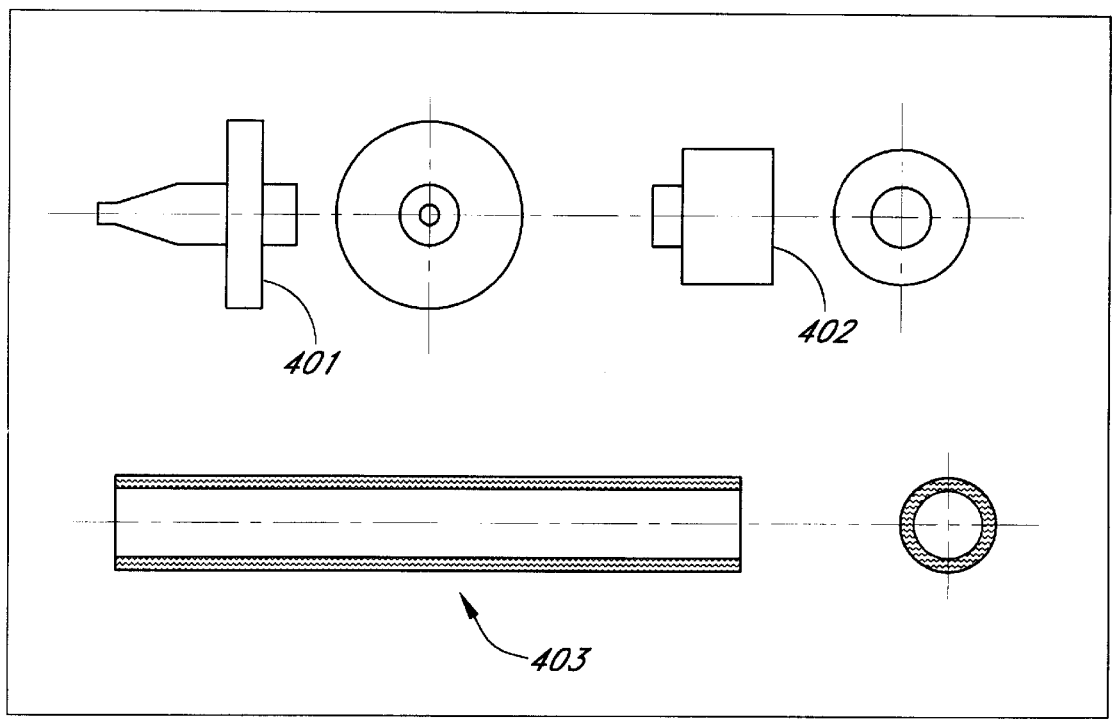
FIG. 4 illustrates parts of a rotation axis of another type of air spindle of the invention.
Figure 5:
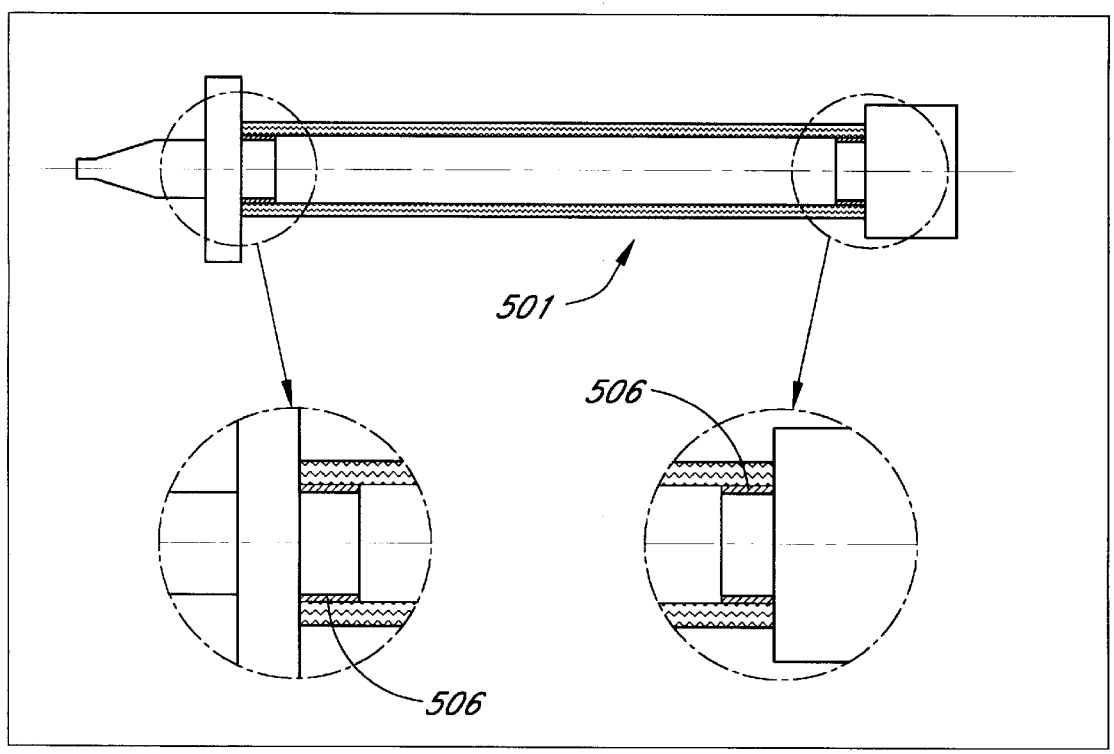
FIG. 5 depicts an assembly of the parts in FIG. 4.

Referring to FIG. 1, two types of air spindle of the present invention are provided (where, aerostatic bearings (105) are positioned at the contacts of a rotation axis): one type (101) is a fiber reinforced composite-tube hybrid type air spindle employing a rotation axis with a tube (104) made of high strength material(such as aluminum, steel, glass fiber composite material, synthetic resin, etc.), which is reinforced by a composite material (103, hereinafter referred to as "reinforced-type composite axis"); and, the other type (102) is a fiber reinforced composite air spindle employing a rotation axis made of only a composite material (hereinafter referred to as "pure composite axis"). FIG. 2 illustrates parts of the reinforced-type composite axis and FIG. 3 depicts an assembly of the parts. FIGS. 4 and 5 illustrate parts of the pure composite axis and an assembly of the parts, respectively.

Referring to FIGS. 2 and 3, the fiber reinforced composite-tube hybrid type air spindle (101) is fabricated by inserting a front steel joining part (201) and an end steel joining part (202) into the front and the end of a rotation axis (203, 301) reinforced by a composite material, by annealing or fitting by force. The reinforced-type composite axis (203) can be fabricated by a concurrent hardening method that multilayers of a composite material (204) are laminated on a tube (205) made of high strength material. At this time, since a high residual thermal stress may occur between the surface of a metal tube and a composite material due to the difference of thermal extension coefficients, a pre-load is preferably applied to the metal tube by giving a calculated amount of compressive load toward an axis direction of the metal tube. Moreover, assembly of the tube and the composite material is preferably realized in a mode that the composite material is laminated to the metal tube at a degree of 5 to 30° to the right-angled cross direction of the tube, to reduce the stress intensity acted on the contact surface. Furthermore, the corrosion occurred at the surface due to the potential difference between the tube and the composite material, can be properly prevented by laminating a carbon fiber epoxy composite material around the tube after winding a glass fiber epoxy composite material on the surface of the tube.

Referring to FIGS. 4 and 5, the fiber reinforced composite air spindle (102) is fabricated by the assembly of steel joining parts (401, 402) into the front and the end of a pure composite axis (403, 501), by the aid of an adhesive cement (506) which is spread between a metal tube and the inside of a composite axis. For this adhesive layer, an adhesive (506) of 0.1 to 1.0 mm thickness is preferably employed, after treating the contact surface with 30 to 200 mesh sand paper to improve the adhesive stress.

Figure 6:
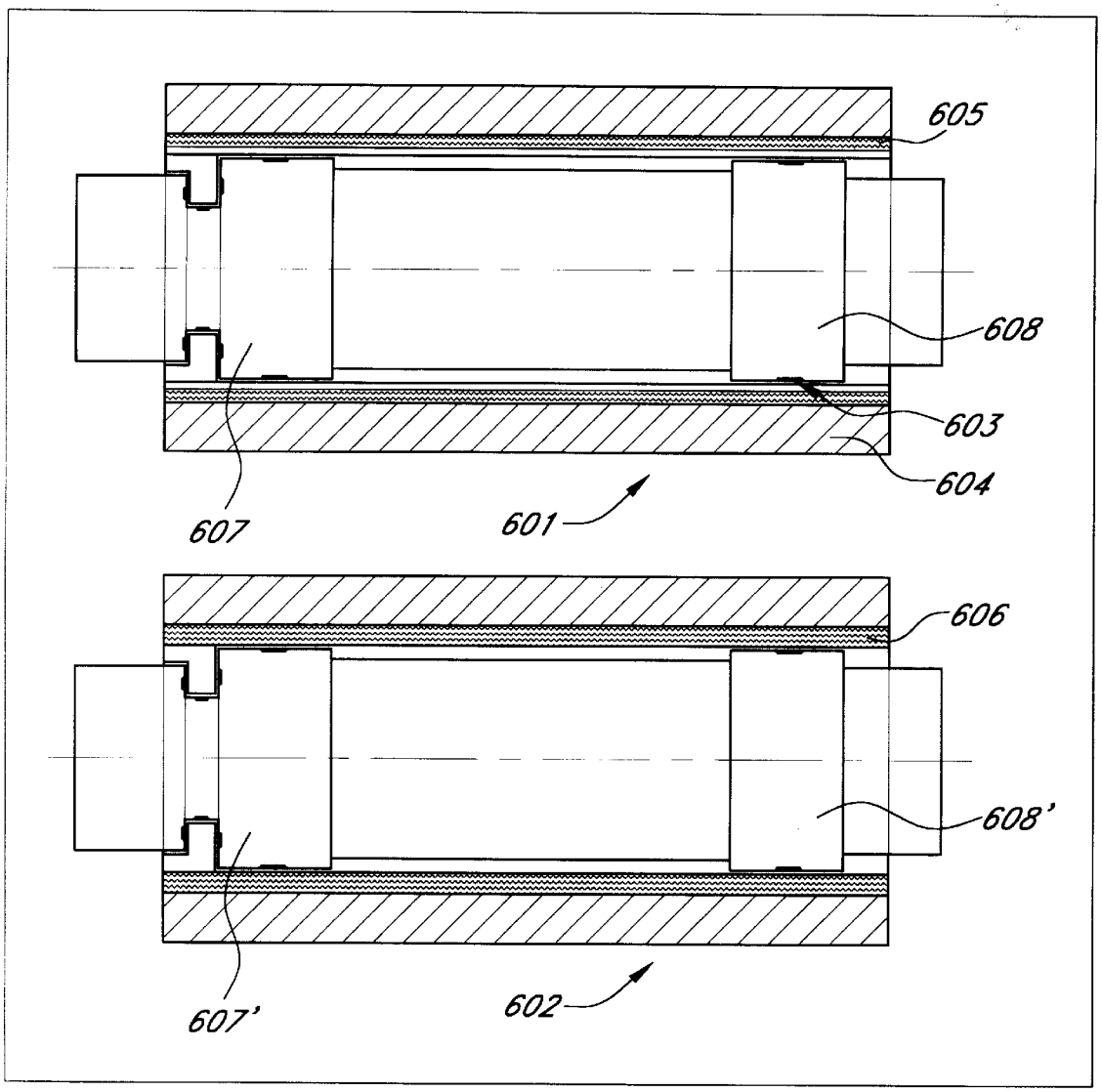
FIG. 6 is a longitudinal-sectional view of two types of air roller of the invention.

Referring to FIG. 6, two types of air roller of the present invention are shown (where, aerostatic bearings (603) are positioned at the contacts of a rotation axis). Since the method for fabricating the air-roller is similar to that of an air spindle, only the differences in these two methods are explained below.

The air roller (601 or 602) is fabricated by the assembly of front steel joining parts (607, 607') and end steel joining parts (608, 608') into the front and the end of a rotation axis (605 or 606) made of a composite material, respectively.

Fiber reinforced composite-tube hybrid type air roller (601) and fiber reinforced composite air roller (602) can be fabricated, respectively, by employing a composite axis of a reinforced-type composite axis (605) or a pure composite axis (606). The air roller (601 or 602) is fabricated in an analogs manner as in the case of air spindle, with an exception of the shape difference of metal parts (607, 608 or 607', 608') to be inserted into the composite material (605 or 606), which is due to the fundamental structural difference of air spindle and air roller. If necessary, the surface of the air roller(601 or 602), to avoid sliding, may be coated (604) with a rubber or synthetic resin having a high friction coefficient. If the sliding is not into consideration, coating is not necessary.

Figure 7:
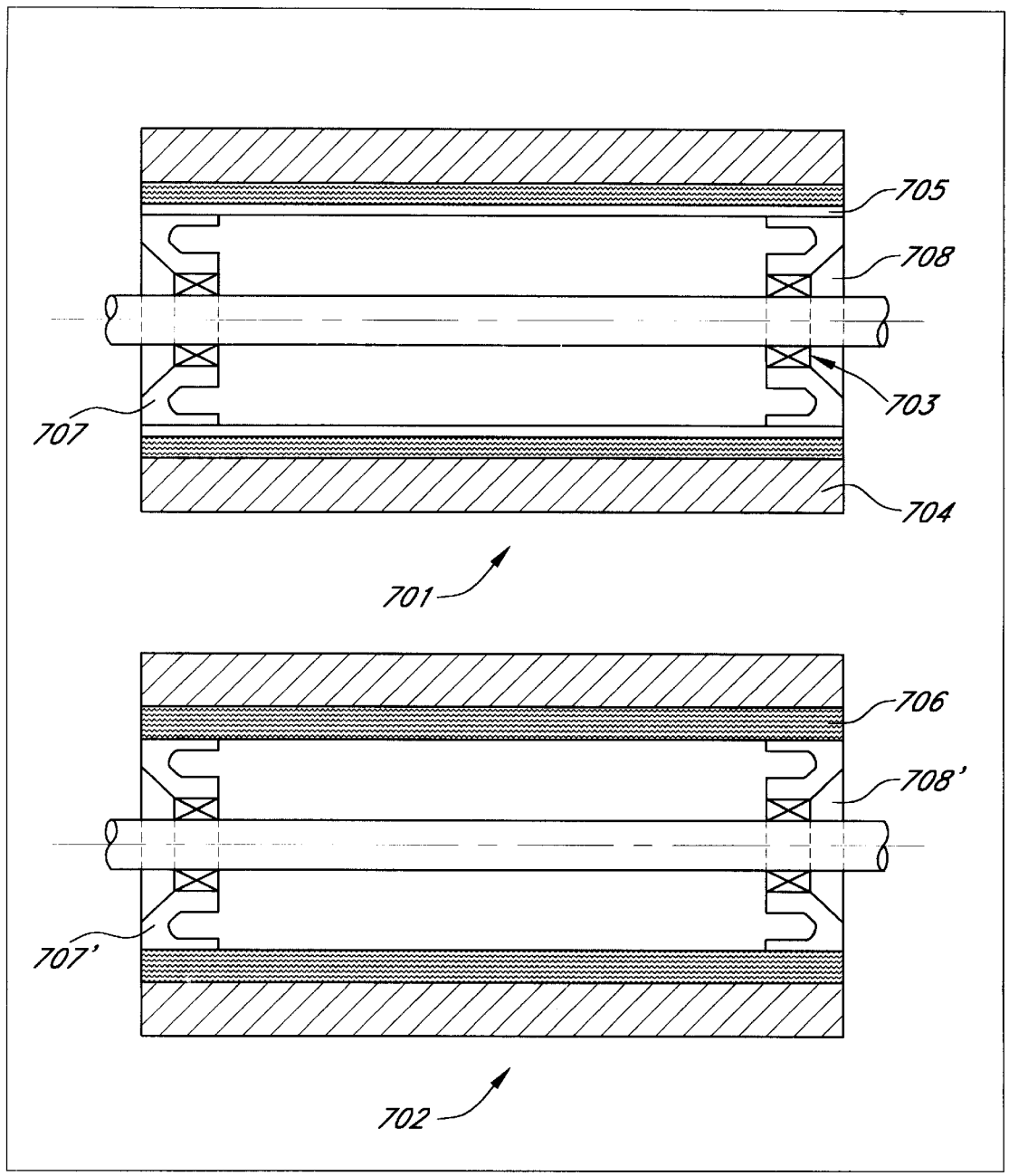
FIG. 7 is a longitudinal-sectional view of two types of ball bearing roller of the invention.

Referring to FIG. 7, two types of ball bearing roller of the invention are illustrated. The ball bearing roller is fabricated in a similar manner as in the air spindle or air roller described above. The ball bearing roller (701 or 702) is fabricated by the assembly of a front steel joining part (707 or 707') and an end steel joining part (708 or 708') into the front and the end of a rotation axis (705 or 706) made of a composite material, respectively.

Fiber reinforced composite-tube hybrid type air roller (701) and fiber reinforced composite air roller (702) can be fabricated, respectively, by employing a composite axis of a reinforced-type composite axis (705) or a pure composite axis (706), in an analogous manner as aboves, except that the metal part is a ball bearing (703). If necessary, the surface of the ball bearing roller (701 or 702) may be coated with a coating material (704) such as rubber or synthetic resin having a high friction coefficient to avoid sliding.

As clearly illustrated and demonstrated above, the present invention provides a method for fabricating spindle and roller with easy control of balancing due to its lightness and less inertia on rotation, by employing rotation axes made of a composite material which has a high stiffness, superior torque transfer capability and natural frequency.

What is claimed is:

1. A method of making a spindle using composite material, the method comprising:

applying a compressive pre-load in an axial direction to a longitudinal metal tube having an outer surface;

applying a composite material around the outer surface of the metal tube; and concurrently hardening the composite material and joining the composite material to the outer surface of the metal tube.

2. A method as defined in claim 1, wherein the application of the composite material comprises laminating a plurality of composite material sheets around the surface of the metal tube.

3. A method as defined in claim 2, wherein the composite material sheets are laminated around the outer surface off a vertical direction of the lonitudinal metal tube at an angle of 5–30°.

4. A method as defined in claim 1, wherein the composite material comprises at least one of carbon fiber epoxy and glass fiber epoxy.

5. A method as defined in claim 4, wherein the application of the composite material comprises applying the carbon fiber epoxy after applying the glass fiber epoxy on the metal tube surface.

6. A method as defined in claim 1, further comprising combining a metallic part to one end of the metal tube.

7. A method as defofined in claim 6, wherein the metallic part is inserted in the one end of the metal tube.

* * * * *

UNITED STATES PATENT AND TRADEMARK OFFICE
CERTIFICATE OF CORRECTION

PATENT NO.     : 6,126,770
DATED          : October 3, 2000
INVENTOR(S)    : Dai-Gil Lee et al.

It is certified that error appears in the above-identified patent and that said Letters Patent is hereby corrected as shown below:

<u>Column 4,</u>
Line 48, please delete "as defofined" and replace therefore with -- as defined --.

Signed and Sealed this

Eighth Day of April, 2003

JAMES E. ROGAN
*Director of the United States Patent and Trademark Office*